United States Patent
Karttunen et al.

(10) Patent No.: US 7,452,593 B2
(45) Date of Patent: Nov. 18, 2008

(54) METHOD OF PRODUCING A POROUS PLASTIC FILM, AND PLASTIC FILM

(75) Inventors: Mikko Karttunen, Tampere (FI); Satu Kortet, Hämeenlinna (FI); Mika Paajanen, Tampere (FI)

(73) Assignee: Valtion Teknillinen Tutkimuskeskus, Espoo (FI)

( * ) Notice: Subject to any disclaimer, the term of this patent is extended or adjusted under 35 U.S.C. 154(b) by 0 days.

(21) Appl. No.: 10/578,266

(22) PCT Filed: Nov. 4, 2004

(86) PCT No.: PCT/FI2004/000652

§ 371 (c)(1),
(2), (4) Date: May 4, 2006

(87) PCT Pub. No.: WO2005/044902

PCT Pub. Date: May 19, 2005

(65) Prior Publication Data

US 2007/0080477 A1    Apr. 12, 2007

(30) Foreign Application Priority Data

Nov. 6, 2003  (FI)  .................................. 20031607

(51) Int. Cl.
  *B32B 5/18*  (2006.01)
(52) U.S. Cl. .................................... 428/323; 264/288.8
(58) Field of Classification Search ................. 428/323; 264/288.8
  See application file for complete search history.

(56) References Cited

U.S. PATENT DOCUMENTS

| 4,654,546 A | 3/1987 | Kirjavainen |
| 5,484,867 A | 1/1996 | Lichtenhan et al. |
| 6,228,904 B1 | 5/2001 | Yadav et al. |
| 6,245,894 B1 | 6/2001 | Matsushima et al. |
| 2001/0018486 A1 | 8/2001 | Lichtenhan et al. |
| 2003/0018109 A1 | 1/2003 | Hsiao et al. |
| 2004/0062834 A1 | 4/2004 | Cruz |
| 2004/0062888 A1 | 4/2004 | Cruz |

FOREIGN PATENT DOCUMENTS

| DE | 10304735 | 7/2004 |
| WO | WO 0076634 | 12/2000 |
| WO | WI 0119596 | 3/2001 |
| WO | WO 200119596 A1 * | 3/2001 |
| WO | WO 0172885 | 10/2001 |
| WO | WO 200172885 A1 * | 10/2001 |
| WO | WO 03035232 | 5/2003 |
| WO | WO03042292 | 5/2003 |

OTHER PUBLICATIONS

Poss Molecules Product literature, 1997, Reade Advanced Materials.*
Nago et al., "Microporous polypropylene sheets containing polymethylsilsesquioxane," Journal of Applied Polymer Science, vol. 50, No. 10, 1993, pp. 1815-22.
Lichtenhan, "Economic and Commercialization of Nanstructured Hybrid Chemicals," Hybrid Plastics, 30 pp.

* cited by examiner

*Primary Examiner*—Carol Chaney
*Assistant Examiner*—Elizabeth Robinson
(74) *Attorney, Agent, or Firm*—Young & Thompson

(57) ABSTRACT

A method of producing a porous plastic film, and a porous plastic film. The plastic film is prepared from a raw material blend comprising a polymer-containing basic material and an additive. Pores are generated in the film by stretching a film preform. The additive comprises a POS(S) chemical.

23 Claims, 4 Drawing Sheets

METHOD OF PRODUCING A POROUS PLASTIC FILM, AND PLASTIC FILM

BACKGROUND OF THE INVENTION

The invention relates to a method of producing a porous plastic film, the method comprising producing a stretchable preform from a raw material blend comprising a polymer-containing basic material and an additive, stretching the blank so as to form a film comprising closed pores.

The invention further relates to a porous plastic film produced from a raw material blend containing a basic material and an additive mixed therewith, a plurality of pores being arranged in the structure of the plastic film.

Porous plastic films are known to possess a plurality of uses as packing material, sealing, thermal insulators, damp-proofs, sound-insulating material, basic material for printed matter and so on. Porous plastic films are also used because they save plastic material as compared with a solid film. Furthermore, the surface of a porous plastic film can be provided with a smooth and pleasant touch, which is a significant advantage in a plurality of applications.

One of the newest applications of a porous plastic film is an electromechanical film, an example being the product known as an EMFi film (Electro Mechanical Film). In an electromechanical-film, dynamic mechanical or acoustic energy generates an electric charge or a change therein, or vice versa, i.e. electric energy is converged into movement, oscillation or sound. Such a film is described in U.S. Pat. No. 4,654,546, for example.

An EMFi film is a thin, typically 30 to 100 μm thick, polypropylene film comprising enclosed cavities and acting as an electret. An electret refers to an object, herein a film, having a permanent electric charge and generating an electric field outside its surface provided the surface of the object is not electrically conductive. At present, a film is provided with a porous structure by biaxial stretching from a polypropylene plastic preform made for this purpose. The preform comprises a polypropylene (PP) that constitutes the matrix part of the film and with which calcium carbonate particles or another corresponding mineral filler is mixed. The particles of the mineral filler nucleate the breaking points or discontinuities of the matrix plastic, which during orientation cause a plurality of enclosed pores or cavities to be generated in the matrix part. After the stretching, the porous film is electrically charged for instance by direct current corona treatment, followed by metallization of at least one of the surfaces of the film.

An electromechanical film has been suggested for application for instance in microphones and loudspeakers, ultrasound detectors, hydrophones, electretic air filters, keyboards and operating switches, movement detectors, dynamic noise suppression applications, self-adhesive posters or the like, pressure, force and acceleration sensors, wind and rain detectors, location detecting floor surfaces and the like.

A problem associated with the production of known biaxially stretched porous films is that the generation of the desired fine-structured pore structure is extremely difficult with the most thermally stable plastics.

A further problem is that only few plastic materials are suitable for use as production material for films. Polypropylene (PP) is mainly used.

A still further problem associated with known porous electromechanical films is that their electromechanical constant ($d_{33}$) decreases significantly and permanently when the temperature rises for a sufficiently long time, which restricts the temperature of use of the film to 50 to 60° C. depending on the application.

BRIEF DESCRIPTION OF THE INVENTION

The object of the present invention is to provide a new and improved method of producing a porous plastic film, and a porous plastic film avoiding the above problems.

The method of the invention is characterized by the additive comprising a POS(S) chemical.

The plastic film of the invention is characterized in that the additive comprises a POS(S) chemical.

An advantage of the invention is that when a material preform comprising POSS (Polyhedral Oligomeric Silsesquioxane) or POS (Polyhedral Oligomeric Silicate) chemical is orientated, the film is provided with an extremely fine-structured pore structure, which, among other things, improves the electromechanical response and sensitivity of the film in electromechanical applications. Let it be mentioned in this connection that in the present application, the abbreviation POS(S) will be used of POSS and POS chemicals. A further advantage is that by selecting the POS(S) appropriately for the matrix polymer structure, porous, particularly porous electromechanical films and/or electret films, may be produced from a plurality of other polymers besides PP. A further advantage is that the electromechanical constant ($d_{33}$) of a film comprising POS(S) chemicals is thermally more stable, i.e. it lowers substantially more slowly as the temperature rises than in known films, i.e. films comprising electromechanical POS(S) chemicals can be utilized in higher working temperatures than similar known films.

BRIEF DESCRIPTION OF THE FIGURES

The invention will be described in more detail in the attached drawings, wherein.

DETAILED DESCRIPTION OF THE INVENTION

Figure 1:
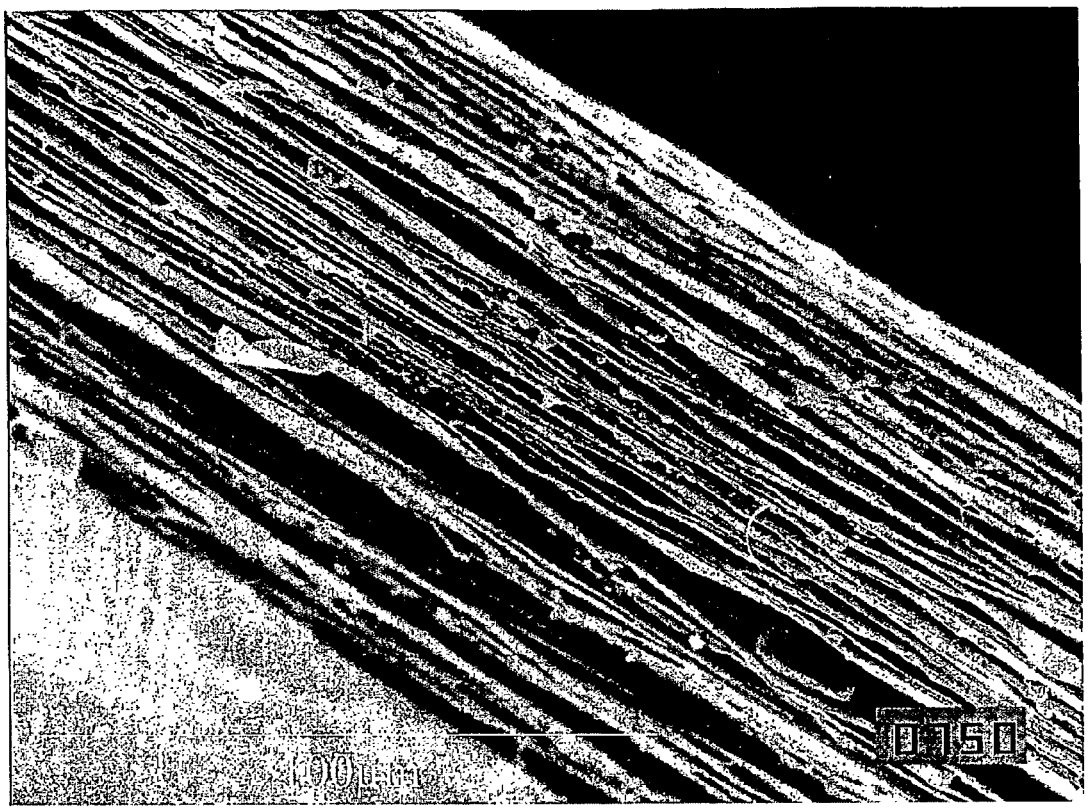
FIG. 1 shows the SEM image of a part of a cross-section of a plastic film according to the invention, FIG. 2 schematically shows the electromechanical constant of the plastic film shown in FIG. 1 as a function of the aging time, and FIG. 3 schematically shows the electromechanical constants of plastic films according to the second and third embodiments of the invention as a function of the aging time.

FIG. 1 shows the SEM (Scanning Electron Microscope) image of a part of a cross-section of a plastic film according to the invention. The enlargement in the figure is 750-fold. The thickness of the film is about 100 μm. The cross-section of the film is filled by numerous lens-like enclosed pores that are oriented in the direction of the surfaces of the film.

The film is made from a basic material comprising a polymer to which a POS(S) chemical has been added.

POS(S) Chemicals

POS(S), which in the present connection refers to both POSS (Polyhedral Oligomeric Silsesquioxane) and POS (Polyhedral Oligomeric Silicate) chemicals, consists of a set of nanostructures having the following empirical formula $$RSiO_{1.5}$$

wherein R is an organic substituent, such as a hydrogen, siloxy or cyclic or linear aliphatic or aromatic group, which may additionally contain reactive functional groups, for instance alcohol, ester, amine, keto, olefin, ether or halide groups. The basis structure of POS(S) comprises a polyhedral Si—O backbone, to which the R groups attach. Homoleptic POS(S) chemicals containing only a single type of R groups, and heteroleptic POS(S) chemicals containing mutually different R groups are known.

At room temperature, POS(S):s are either solid or liquid. When being mixed with a basic material, solid POS(S) melts or remains in the solid state depending on the parameters of the mixing process. For instance the following POS(S) chemicals may be applied to the invention: dodecaphenyl-POSS $C_{17}H_{60}O_{18}Si_{12}$, isooctyl-POSS $[Me_3CCH_2CH(Me)CH_2]_nT_n$, wherein n=8, 10 or 12, octacyclohexyl-POSS $C_{48}H_{88}O_{12}Si_8$, octacyclopentyl-POSS $C_{40}H_{72}O_{12}Si_8$, octaisobutyl-POSS $C_{32}H_{72}O_{12}Si_8$, octamethyl-POSS $C_8H_{24}O_{12}Si_8$, octaphenyl-POSS $C_{48}H_{40}O_{12}Si_8$, octa-TMA-POSS $C_{32}H_{96}O_{20}Si_8 \cdot \sim 60\ H_2O$, dodecatrifluoropropyl-POSS $C_{36}H_{48}F_{36}O_{18}Si_{12}$, octatrimethylsiloxy-POSS $C_{24}H_{72}O_{20}Si_{16}$, phenetyl-POSS $(PhCH_2CH_2)_nT_n$, wherein n=8, 10 or 12, phenetylisobutyl-POSS $C_{36}H_{72}O_{12}Si_8$. Let it be mentioned that the chemicals presented herein are only some examples of feasible POS(S) chemicals. Other POS(S) chemicals may very well be utilized in the different embodiments of the invention.

POS(S) compounds are described for instance in WO publication 01/072885, whose priority application is U.S. Ser. No. 60/192,083.

Basic Materials

The basic material may be polypropylene (PP) or some other thermoplastic polymer, copolymer or polymer blend that can be stretched at least monoaxially. As examples may be mentioned cyclic olefin copolymers (COC), cyclic olefin polymers (COP), polymethylpentene (PMP), such as TPX®, polyethylene terephthalate (PET), polybutene terephtalate (PBT), polyethylene naphthalate (PEN), a blend of polyethylene naphthalate and polyeterimide PEN/PEI.

As the basic material for an electromechanical porous film and/or porous electret film, any plastic that can be stretched at least monoaxially and preferably to at least a three-fold length is generally suitable. This results in a sufficiently flat porous structure. In connection with the stretching, orientation of the plastic molecules may occur. In addition, the plastic has to have a sufficiently low conductivity and cannot substantially absorb moisture. The dielectric strength of the plastic has to be sufficient, so that partial discharges occur in the pores in connection with a direct current charge. Furthermore, taking into account the final use of the film, the plastic has to be thermally sufficiently stable.

The basic material may naturally contain not only the polymer, but also additives, admixtures and fillers well known to a person skilled in the art.

EXAMPLE 1

The film shown in FIG. 1 is produced as follows:

The blend was prepared by blending the basic material, Borclean HB300BF and a POS(S) additive Hybrid Plastics MS0830 such that the amount of additive was 20 percent by weight of the weight of the basic material. Hybrid Plastics MS0830 is octamethyl-POSS, its chemical formula being $C_8H_{24}O_{12}Si_8$. Blending was carried out with the blending part of a Brabender Plasticorder device. The set temperature of the blender was 190° C., and the speed of rotation during the dosing of the additive was 70 min$^{-1}$, and after the dosing 100 min$^{-1}$. Blending time was 15 min. During blending, PP melted, while POS(S) remained in a solid state.

The blend obtained as a result of the blending was compounded by driving it twice in succession through an extruder, Berstorff ZE 25×48 D double-screw extruder. The set temperature of the extruder was 200° C. and speed of rotation 200 min$^{-1}$. Of the thus obtained plastic film raw material blend, a plate-like preform was prepared by extrusion with a single-screw extruder, Brabender Plasticorder. The thickness of the preform prepared was 1,200 μm.

The preform was stretched in a biaxial stretching device Lab Stretcher Karo IV. The draw ratio was 4.8:1 at a draw speed of 15 m/min both in the MD (machine direction) and TO (transverse direction) directions. The temperature of the preform was about 155° C. As a result of the stretching, a countless amount of lens-like closed pores were surprisingly generated in the film and a film was obtained whose cross-section is shown in FIG. 1. The film was very flexible and soft.

In principle, the inside of the film has a diphase structure: a matrix composed mainly of the basic material and pores containing gas. The dimensions of the pores in the direction of the surface of the film are about 10 to 100 μm. The pores have agglomerates comprising POS(S), whose diameter is typically below 5 μm. On the basis of an EDS analysis (Electron Dispersive Spectroscopy), the matrix also contains POS(S). However, it is dispersed as so small particles that the POS(S) particles cannot be seen in FIG. 1.

It was also observed that the module of the matrix increased as a result of the addition of the additive. This may be considered an indication of the dispersion of the POS(S) chemical into the matrix.

The film was charged by direct current corona treatment. Herein, a base plate connected to the ground potential was used, upon which the film to be treated was fastened. One corona peak electrode was arranged at a few centimeters from the sample. The film was subjected to a 55 kV direct-current voltage for a period of 2 to 5 s. Let it be mentioned that the charging can be performed within a wide corona voltage range depending on the film structure, e.g. 15 to 60 kV, and at different gas atmospheres and gas pressures.

After the corona treatment, conductive electrode elements were prepared on the surfaces of the charged film by cold sputtering by the use of an Au-target-electrode.

Properties of the Film

Figure 2:
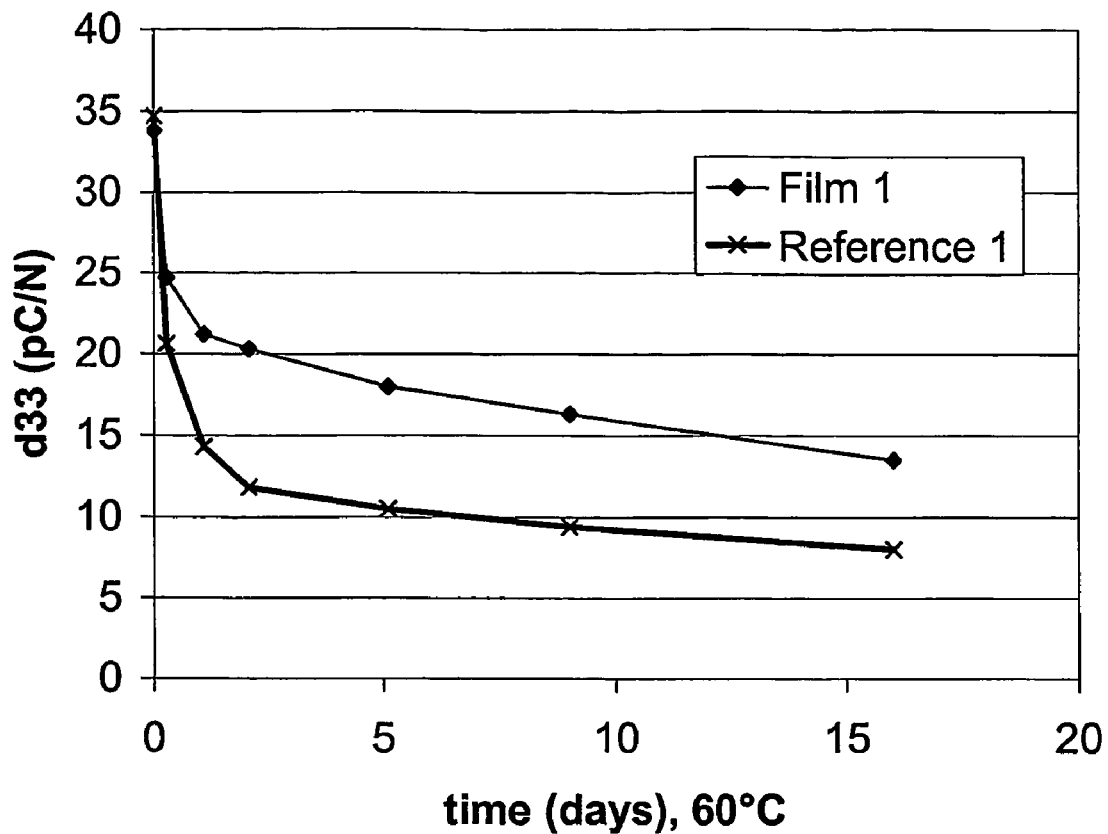

FIG. 2 shows the electromechanical constant $d_{33}$ of the plastic film shown in FIG. 1 as a function of the aging time. Although it is evident to a person skilled in the art, let be confirmed that $d_{33}$ refers to the electromechanical constant of the film measured in the direction of the thickness of the film. In the figure, said film is denoted by the identifier 'Film 1'. Reference 1 is a prior art PP film having a conventional mineral filler as the additive. The aging temperature was 60° C.

The $d_{33}$ measurement was carried out by means of a charge amplifier. The gilded sample was measured at six different measuring points, of which the first three were on the upper surface of the sample and the second three on the lower surface, but at the same points of the sample as the first measuring points. The frequency of the sinusoidal dynamic force directed at the sample in the measurement was 2 Hz, the amplitude being 1.5 N.

FIG. 2 shows that the film according to the invention retains its charging level clearly significantly better than a conventional film. The film according to the invention can thus be employed at substantially higher temperatures, which considerably widens the number of feasible applications of the film.

Figure 3:
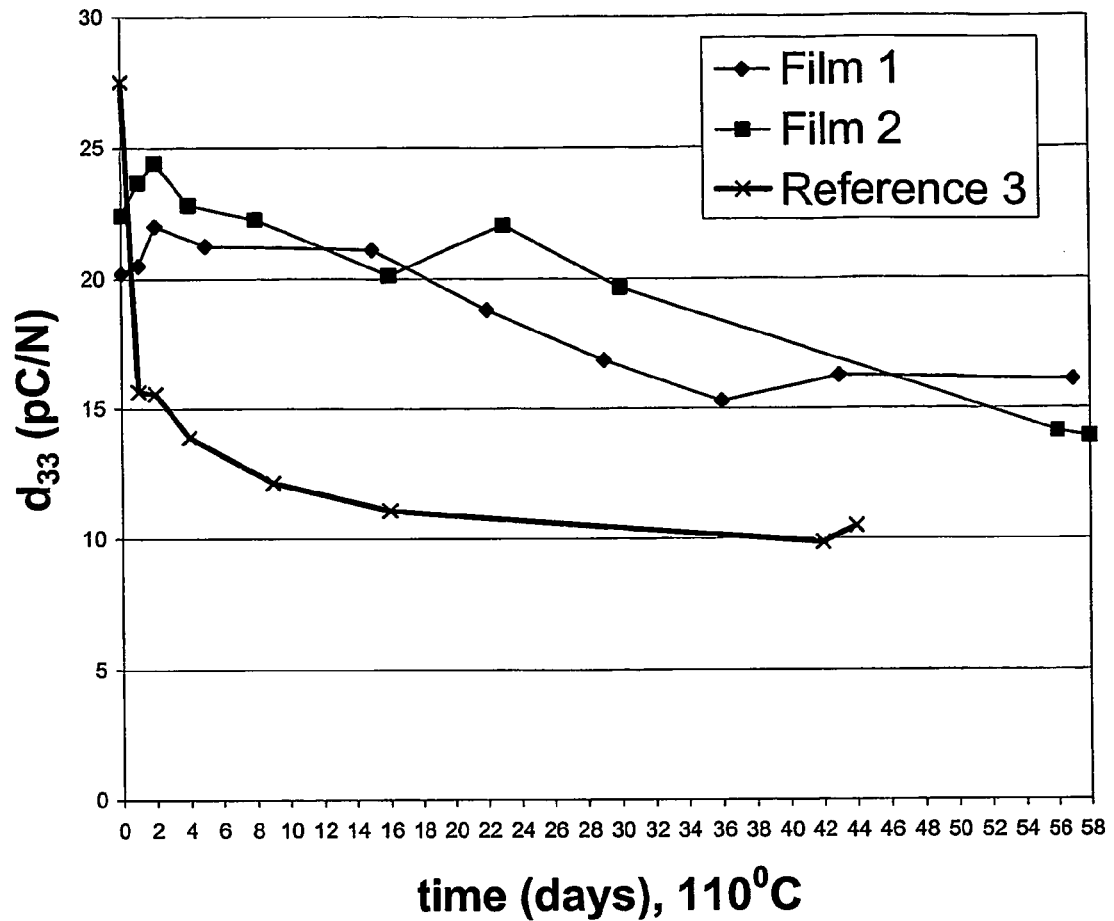

FIG. 3 schematically shows the electromechanical constant $d_{33}$ of a film according to a second and third embodiment of the invention as a function of the aging time. Said films are denoted by the identifier 'Film 2' and 'Film 3'. The basic material of the films is composed of two components: Topas 6015 and Topas 8007. Both said materials belong to cyclic olefin copolymers (COC). Film 2 is prepared in accordance with the following Example 2 and Film 3 in accordance with Example 3. The reference film, Reference 3, is a film according to Example 3, wherein the additive is not a POS(S) chemical, but a conventional mineral filler.

EXAMPLE 2

Film 2 was prepared as follows:

15 percent by weight of additive Hybrid Plastics MS0830, calculated from the weight of the polymer, was blended with Topas 6015. The blending took place in a Brabender Plasticorder blender whose set temperature was 260° C. and speed of rotation at the additive dosing stage 70 $min^{-1}$ followed by 120 $min^{-1}$.

The blend was compounded by running it twice through a Berstorff ZE 25×48 D double-screw extruder by simultaneous addition of Topas 8007 plastic material to the blend such that the ratio of Topas 6015 to Topas 8007 was 80/20 in the raw material blend of the film obtained as a result of the compounding, the proportion of the additive being about 9 percent by weight calculated from the weight of the plastic material.

The set temperature of the extruder was 270° C. at the first part of the screw and 250° C. at the last part of the screw, the speed of rotation being 200 $min^{-1}$.

The raw material blend obtained as a result of the compounding was extruded as a plate-like preform with a Brabender Plasticorder extruder. The thickness of the preform was about 740 µm.

The preform was stretched in a biaxial stretching device Lab Stretcher Karo IV. The draw ratio was 3 both in the MD and TD directions. The temperature of the preform was about 169° C. and the draw speed 0.5 m/min.

After the stretching, the film was expanded by the use of the gas diffusion method. The saturation phase of the expansion lasted for 95 min, the temperature being 50° C. and the pressure 60 bar. The expansion phase succeeding the saturation phase at normal pressure lasted for 0.5 min, the temperature being 140° C. The thickness of the film before the expansion was about 88 µm and after the expansion about 99 µm.

The structure of the film prepared in Example 2 was similar to that of the film presented in FIG. 1.

The film was charged by corona treatment and metallized on both sides in the manner described in connection with Example 1. The electromechanical constant was also measured in the manner described above.

As FIG. 3 shows, the electromechanical constant $d_{33}$ of the film according to the invention, Film 2, is substantially higher than that of the conventional reference film.

EXAMPLE 3

Film 3 was prepared as follows:

The basic material is prepared from a blend of materials Topas 6015 and Topas 8007, but in this case such that the ratio of said components in the blend is 90/10 percent by weight.

The blend was prepared in the same manner and with the same devices and blending parameters as in Example 2 with the exception of the blending time, which was 12 min.

The blend was compounded by running it twice through an extruder, the set temperature of the extruder being 270° C. at the first part of the screw and 250° C. at the last part of the screw, and the speed of rotation being 200 $min^{-1}$. At the same time, material Topas 8007 was added to the blend. The ratio of Topas 6015 to Topas 8007 was 90/10 in the raw material blend of the film obtained as a result of the compounding, the proportion of the additive being 10 percent by weight calculated from the weight of the plastic material.

The raw material blend obtained as a result of the compounding was extruded as a plate-like preform with a Brabender Plasticorder extruder. The thickness of the preform was about 780 µm.

The preform was stretched in a biaxial stretching device Lab Stretcher Karo IV. The draw speed was 0.5 m/min and the draw ratio was 3.1:1 both in the MD and TD directions. The temperature of the preform was 164° C.

The biaxially stretched film was expanded. The pressure of the saturation phase was 40 bar, the saturation time 60 min, and the saturation temperature was 60° C. The temperature of the expansion phase at normal pressure was 145° C, and the duration 0.5 min. The thickness of the film before the expansion was about 78 µm and after the expansion about 86 µm.

The film was charged by corona treatment and coated with electrode material in the manner described in connection with Example 1. The electromechanical constant was also measured in the above manner.

As FIG. 3 shows, the electromechanical constant $d_{33}$ of the film prepared in Example 3 decreases extremely slowly compared with a corresponding film wherein the additive is not a POS(S) chemical, but a conventional mineral filler.

EXAMPLE 4

Figure 4:
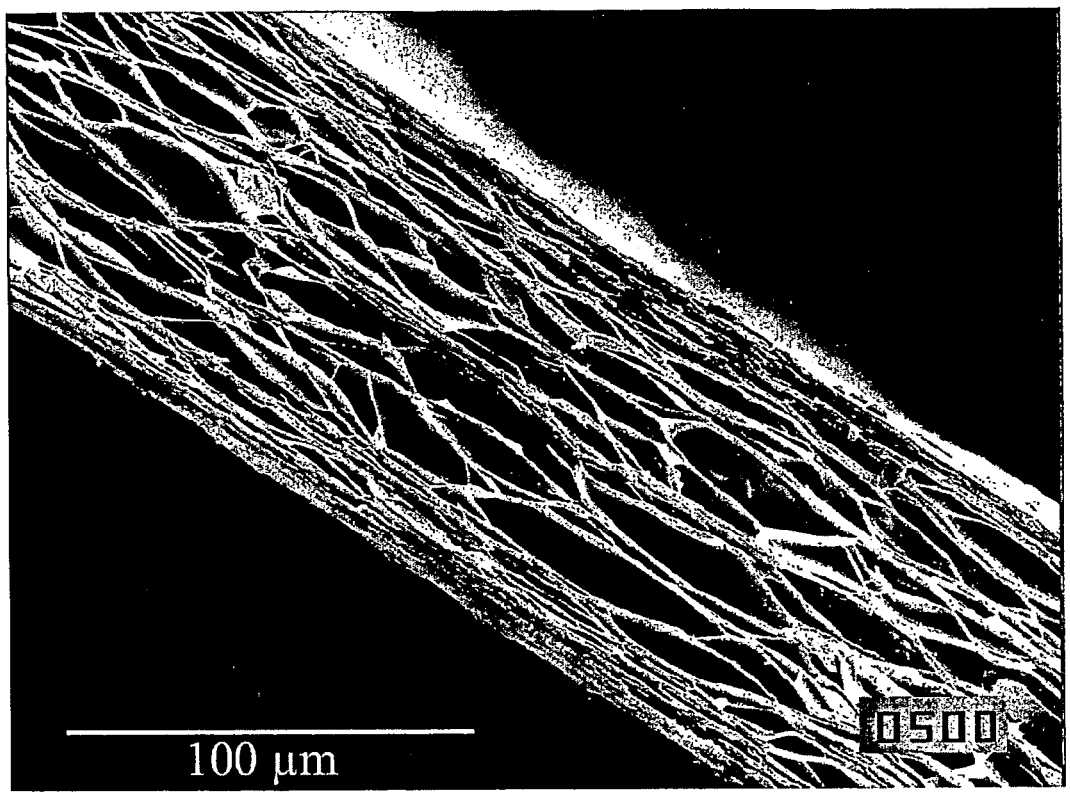
FIG. 4 shows the SEM image of a part of a cross-section of a plastic film according to the fourth embodiment of the invention.

FIG. 4 shows the SEM image of a part of the cross-section of a plastic film according to a fourth embodiment of the invention.

The film shown in FIG. 4 is prepared as follows:

The blend was prepared by blending the basic material, Topas 6015, which is a COC polymer, with a POS(S) additive Hybrid Plastics MS0825 such that the amount of additive was 15 percent by weight of the weight of the basic material. Blending was carried out with the blending part of a Brabender Plasticorder device. The set temperature of the blender was 250° C., and the speed of rotation during the entire blending was 70 $min^{-1}$. Blending time was 12 min. During blending, both the basic material and the POS(S) additive melted. MS0825 is a polymorphous material having melting points 55° C. and 269° C.

The blend obtained as a result of the blending was compounded by driving it twice in succession through an extruder, Berstorff ZE 25×48 D double-screw extruder, and by simultaneous addition to the blend of Topas 8007 basic material, which is a COC polymer. The set temperature of the extruder at the first part of the screw was 275° C. and 270° C. at the last part of the screw. The speed of rotation of the screw was 200 $min^{-1}$.

The raw material blend obtained as a result of the compounding had a ratio of Topas 6015 to Topas 8007 of 90/10, the portion of the additive being 10 percent by weight measured from the weight of the plastic material. A plastic film was prepared from this raw material blend by extrusion with a single-screw extruder, Brabender Plasticorder.

The plastic film was shredded and extruded again as a plate-like preform having a thickness of about 610 µm. The preform was stretched biaxially in a stretching device Lab Stretcher Karo IV. The draw ratio was 3.3 both in the MD (machine direction) and TD (transverse direction) directions. The draw speed was 1 m/min, the temperature of the preform being about 162° C. An extremely fine pore structure was achieved in the film.

After the stretching, the film was expanded by the use of the gas diffusion method. The saturation phase of the expansion lasted for 51 min, its temperature being 60° C. and pressure 20 bar. The expansion phase succeeding the saturation phase at normal pressure lasted for 0.5 min, the temperature being 150° C. The thickness of the film was about 59 µm before the expansion and after the expansion about 102 µm.

As a result of the expansion a film was obtained whose cross-section is shown in FIG. 4. It can be observed that the structure of the film is extremely porous. Since the POS(S) melted in the compounding, the POS(S) agglomerates crystallized from the melt and having a size range of some tens of nanometers can have acted as the nucleators of the pores.

However, the mechanism with which the POS(S) acts as a cavitating agent generating pores is still to be explained. One alternative is that the POS(S) agglomerates having a size range of about 1 to 2 µm act as the nucleators of the pores. The dissolved POS(S) agglomerates smaller than this, having a diameter of perhaps some tens of nanometers, or individual POS(S) molecules increase the stability of the matrix. Another alternative is that said dissolved agglomerates or individual molecules nucleate the pores. In this case, the larger POS(S) agglomerates shown in the pores of the SEM images would have no substantial meaning as regards the generation of the pores. The reason why the electromechanical properties of the porous film according to the invention are thermally stable also remains to be explained. The reason may be the extremely porous structure of the film. Nevertheless, as mentioned, the mechanisms remain to be cleared.

EXAMPLE 5

A blend was prepared by blending a basic material Topas 6015, which is a COC polymer, and a POS(S) additive, Hybrid Plastics MS0830, such that the amount of additive was 10 percent by weight of the weight of the basic material. The blending, the preparation of the preform, the stretching and expansion of the preform were performed in accordance with the principles described above.

A porous film was prepared from the blend.

The drawings and the related description are only intended to illustrate the idea of the invention. The details of the invention may vary within the scope of the claims. Accordingly, the thickness of the film depends on the application: in electromechanical and/or electret applications, the maximum thickness of the film is determined by the means used in charging the film. Typically, the thickness of an electromechanical film is below 200 µm, preferably 5 to 150 µm, still more preferably 20 to 120 m, extremely preferably 30 to 70 µm. In electromechanical and/or electret applications, the practical upper limit of the thickness of the film is 2 to 3 mm, which is dictated by the electrical charge method employed in charging the film. In other than electromechanical applications, the thickness of the film may be substantially larger. In said applications, the upper limit of the thickness of the film is dictated by the dimensions and capacity of the production equipment. Films according to the invention may naturally be joined together one upon the other, whereby larger product thicknesses are achieved. The joining can be implemented for example by gluing or by a corresponding manner known per se.

On the one hand, the invention enables the production of electromechanical film application forms wherein the change in electromechanical energy is based on the change in the thickness of the film in the electrical field, or, on the other hand, such electromechanical film application forms wherein the change in electromechanical energy is based on the change in the location of the film in the electrical field. These are principles known per se to a person skilled in the art, and are therefore not described in more detail herein.

Conductors or electrodes arranged on one or both sides of the film may be made for instance by vacuum evaporation, sputtering, printing, lamination or another corresponding method known per se.

The POS(S) may contain one or more reactive groups bound to a polymer chain, either direct to the polymer backbone or as a side group of the polymer backbone.

The POS(S) may be blended with the basic material together with a carrier. The carrier may be for instance a filler, such as silica, to the surface of whose particles the POS(S) is bound. Binding to the carrier agent can be implemented for instance via a suitable reactive group of the POS(S) chemical.

The amount of POS(S) chemical, calculated from the weight of the basic material, may be 0.1 to 50 percent by weight, preferably 10 to 20 percent by weight.

The preform may be prepared, not only by extrusion, but also by injection moulding or another moulding method and from a solution.

The draw ratio used in the biaxial draw is preferably about 2:1 to 8:1 depending on the preform to be drawn and particularly on the material to be drawn. The draw ratio may also be different in the MD and TD directions.

The electromechanical film may be charged by any method that produces a sufficiently strong electric field over the film.

As was described in the examples, if desired, the film may be expanded. Preferably, the expansion pressure is between 20 and 60 bars.

The invention claimed is:

1. A method of producing a porous plastic film, the method comprising:
   producing a stretchable preform from a raw material blend comprising a polymer-containing basic material and an additive;
   stretching the preform so as to form a film comprising pores; and
   charging the porous film by directing an electric field over the porous film, wherein,
   the additive comprises a POS(S) chemical,
   at least part of the POS(S) chemical is in agglomerates, and each agglomerate has a diameter in a range of 1 µm to 5 µm.

2. A method as claimed in claim 1, wherein the preform is stretched biaxially.

3. A method as claimed in claim 1, wherein the preform is stretched within a draw ratio range of 2:1 to 8:1.

4. A method as claimed in claim 1, wherein the POS(S) is in a solid state at room temperature.

5. A method as claimed in claim 4, wherein the POS(S) is blended with the basic material at a temperature lower than the melting temperature of the POS(S).

6. A method as claimed in claim 4, wherein the POS(S) is blended with the basic material at a temperature exceeding the melting temperature of the POS(S).

7. A method as claimed in claim 1, wherein the POS(S) is in a liquid state at room temperature.

8. A method as claimed in claim 1, wherein the POS(S) comprises one or more of the following chemicals: dodecaphenyl-POSS $C_{17}H_{60}O_{18}Si_{12}$, isooctyl-POSS $[Me_3CCH_2CH(Me)CH_2]_n(SiO_{1.5})_n$, wherein n=8, 10 or 12, octacyclohexyl-POSS $C_{48}H_{88}O_{12}Si_8$, octacyclopentyl-POSS $C_{40}H_{72}O_{12}Si_8$, octaisobutyl-POSS $C_{32}H_{72}O_{12}Si_8$, octamethyl-POSS $C_8H_{24}O_{12}Si_8$, octaphenyl-POSS $C_{48}H_{40}O_{12}Si_8$, octa-TMA-POSS $C_{32}H_{96}O_{20}Si_8$·~60 $H_2O$, dodecatrifluoropropyl-POSS $C_{36}H_{48}F_{36}O_{18}Si_{12}$, octatrimethylsiloxy-POSS $C_{24}H_{72}O_{20}Si_{16}$, phenetyl-POSS $(PhCH_2CH_2)_n(SiO_{1.5})_n$, wherein n=8, 10 or 12, phenetylisobutyl-POSS $C_{36}H_{72}O_{12}Si^8$.

9. A method as claimed in claim 1, wherein the basic material comprises one or more of the following polymers: polypropylenes, cyclic olefin copolymers, cyclic olefin polymers, polymethylpentene, polyethylene terephthalate, polybutene terephtalate, polyethylene naphthalate, polyetherimide.

10. A method as claimed in claim 1, wherein the thickness of the porous plastic film is 5 to 200 μm.

11. A method as claimed in claim 1, wherein the amount of POS(S) is 0.1 to 50 percent by weight calculated from the weight of the basic material.

12. A method as claimed in claim 1, wherein the pores comprised by the film are expanded with gas.

13. A method as claimed in claim 1, wherein an electrically conductive element is prepared on at least one side of the porous film.

14. A porous plastic film produced from a raw material blend comprising:
    a basic material and an additive mixed therewith; a
    plurality of pores being arranged in the structure of the plastic film, the pores being produced by stretching a preform made from the raw material blend; and
    an electrical charge, wherein,
    the additive comprises a POS(S) chemical,
    at least part of the POS(S) chemical is in agglomerates, and
    each agglomerate has a diameter in a range of 1 μm to 5 μm.

15. A plastic film as claimed in claim 14, wherein the pores are produced by stretching the preform biaxially.

16. A plastic film as claimed in claim 14, wherein the draw ratio of the stretching is within a draw ratio range of 2:1 to 8:1.

17. A plastic film as claimed in claim 14, wherein the pores are closed pores.

18. A plastic film as claimed in claim 14, wherein the POS(S) comprises one or more of the following chemicals: dodecaphenyl-POSS $C_{17}H_{60}O_{18}Si_{12}$, isooctyl-POSS $[Me_3CCH_2CH(Me)CH_2]_n(SiO_{1.5})_n$, wherein n=8, 10 or 12, octacyclohexyl-POSS $C_{48}H_{88}O_{12}Si_8$, octacyclopentyl-POSS $C_{40}H_{72}O_{12}Si_8$, octaisobutyl-POSS $C_{32}H_{72}O_{12}Si_8$, octamethyl-POSS $C_8H_{24}O_{12}Si_8$, octaphenyl-POSS $C_{48}H_{40}O_{12}Si_8$, octa-TMA-POSS $C_{32}H_{96}O_{20}Si_8$·~60 $H_2O$, dodecatrifluoropropyl-POSS $C_{36}H_{48}F_{36}O_{18}Si_{12}$, octatrimethylsiloxy-POSS $C_{24}H_{72}O_{20}Si_{16}$, phenetyl-POSS $(PhCH_2CH_2)_n(SiO_{1.5})_n$, wherein n=8, 10 or 12, phenetylisobutyl-POSS $C_{36}H_{72}O_{12}Si^8$.

19. A plastic film as claimed in claim 14, wherein the basic material comprises one or more of the following polymers: polypropylenes, cyclic olefin copolymers, cyclic olefin polymers, polymethylpentene, polyethylene terephthalate, polybutene terephtalate, polyethylene naphthalate, polyetherimide.

20. A plastic film as claimed in claim 14, wherein at least one of its surfaces is at least partly coated with an electrically conductive coating.

21. A plastic film as claimed in claim 14, wherein it is an electromechanical film and/or an electret film.

22. A plastic film as claimed in claim 21, wherein a change in electromechanical energy is arranged to take place through a change in the thickness of the film.

23. A plastic film as claimed in claim 21, wherein a change in electromechanical energy is based on variation of the location of the film in an electric field.

* * * * *